United States Patent [19]

Kostrzewsky

[11] Patent Number: 5,669,717
[45] Date of Patent: Sep. 23, 1997

[54] CENTER FLANGE BEARING SUITABLE FOR USE WITH ELECTRICAL MACHINERY

[75] Inventor: Gregory J. Kostrzewsky, Columbus, Ind.

[73] Assignee: Reliance Electric Industrial Co., Cleveland, Ohio

[21] Appl. No.: 730,555

[22] Filed: Oct. 15, 1996

[51] Int. Cl.[6] .................. F16C 33/74; F16C 33/10; F16C 35/02
[52] U.S. Cl. .................. 384/144; 384/130; 384/213; 384/406; 384/434; 384/448
[58] Field of Search ..................... 384/130, 143, 384/144, 213, 204, 404, 405, 406, 107, 112, 434, 448, 476, 480, 906

[56] References Cited

U.S. PATENT DOCUMENTS

| | | | |
|---|---|---|---|
| 3,044,838 | 7/1962 | Winer et al. | 384/213 |
| 3,544,179 | 12/1970 | De Leu | 384/406 X |
| 3,806,210 | 4/1974 | Deleu | 384/406 |
| 4,531,845 | 7/1985 | Heshmat | 384/406 |
| 4,674,894 | 6/1987 | Heshmat | 384/406 |
| 4,765,760 | 8/1988 | Heshmat et al. | 384/406 X |
| 5,480,232 | 1/1996 | Lendway | 384/144 X |
| 5,529,399 | 6/1996 | Holze | 384/107 |

OTHER PUBLICATIONS

A publication by Renk Aktiengesellschaft of Hannover, Germany, entitled "Slide Bearings Type EM for Shaft Diameter Range 80–300mm." Jul. 1994.
A publication by Glyco–Maschinenbau GmbH of Essen, Germany, entitled "Glyco Normgleitlager; Gehausegleitlager." No Date.
A publication by Glacier of Glasgow, Scotland, entitled "Glacier Designers' Handbook No. 12; Horizontal Bearing Assemblies HSR Range." No Date.
A publication by Desch Antriebstechnik GmbH of Arnsberg, Germany, entitled "Flanschgleitlager." No Date.
DIN Standard 31,694. Sep. 1990.

Primary Examiner—Thomas R. Hannon
Attorney, Agent, or Firm—Craig N. Killen; John M. Miller; John J. Horn

[57] ABSTRACT

A hydrodynamic sleeve bearing for supporting the shaft of a relatively large electromechanical machine. The bearing includes a base element and a cap element matable about the shaft to produce the bearing housing. The bearing housing when assembled includes a shaft receiving portion through which the shaft extends and a sump portion for containing a lubricant fluid. The design of the present invention minimizes the axial length of the shaft receiving portion to approximately that of the bearing liner contained therein. As a result, the weight of the cap element will be significantly reduced over many prior art constructions. Respective lubricant seals are attached at opposite end faces of the shaft receiving portion. The lubricant seals and the end faces are configured to permit lubricant fluid to flow directly back into the sump. The lubricant seals may be installed in a plurality of angular orientations, which may be particularly useful if a selected sensor device is installed thereon. The axial length of the bearing liner and shaft receiving portion is less than that of the sump. In addition, cooling fins are defined on both axial sides of the sump portion of the bearing housing for increased cooling capacity. The bearing liner is electrically isolated from the bearing housing and means are provided to check the integrity of this electrical isolation during use. An oil ring is provided to generate the desired hydrodynamic film, or a circulating oil system may be utilized.

60 Claims, 9 Drawing Sheets

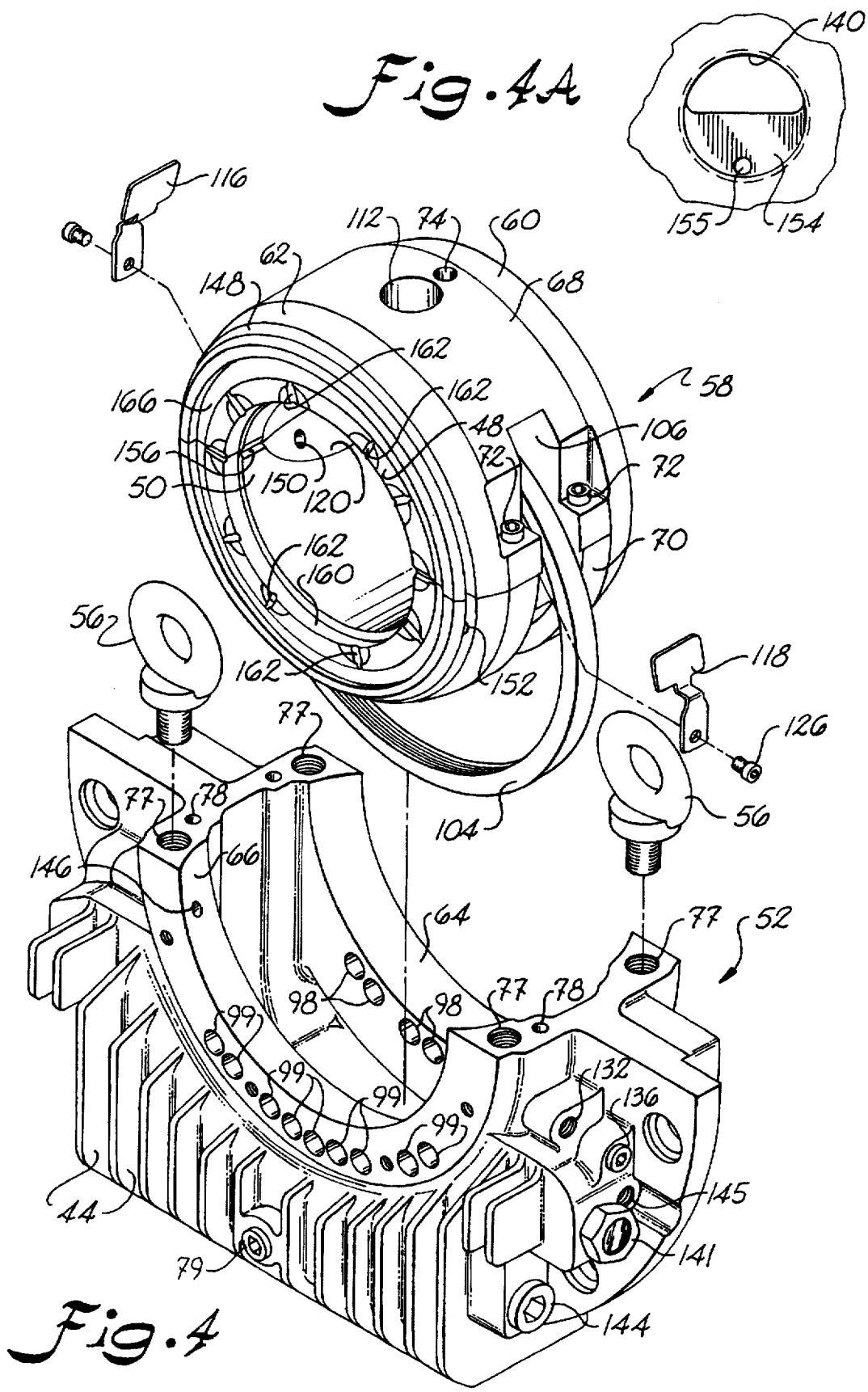

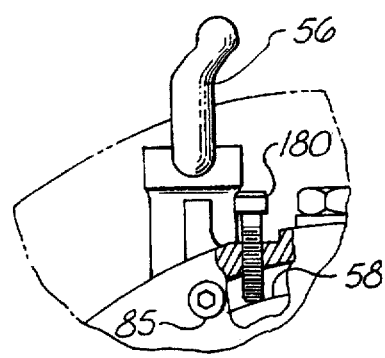
Fig. 10
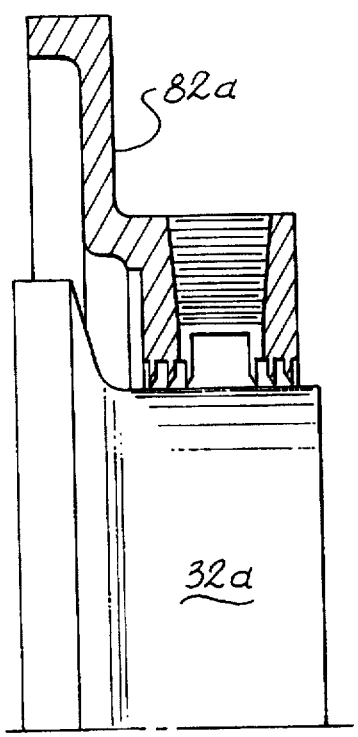 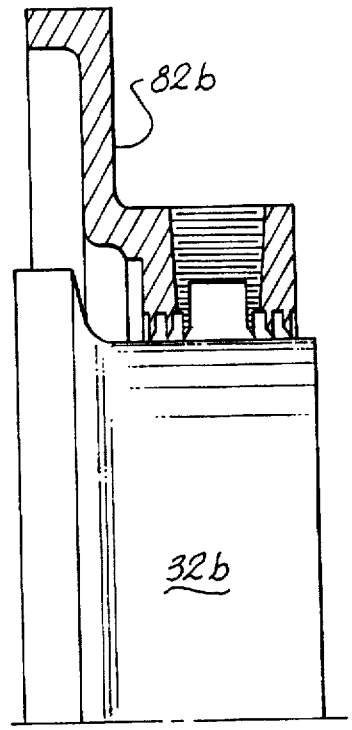 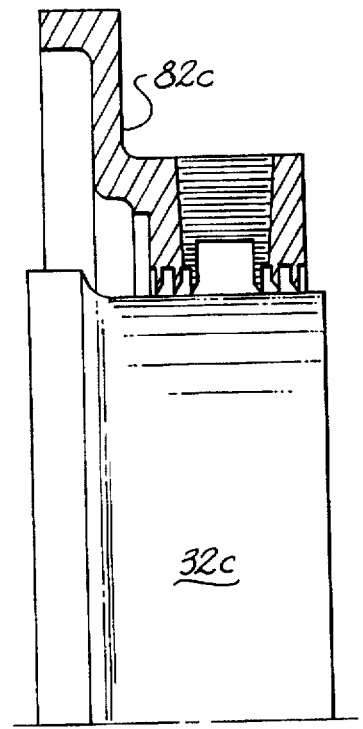
Fig. 11A  Fig. 11B  Fig. 11C

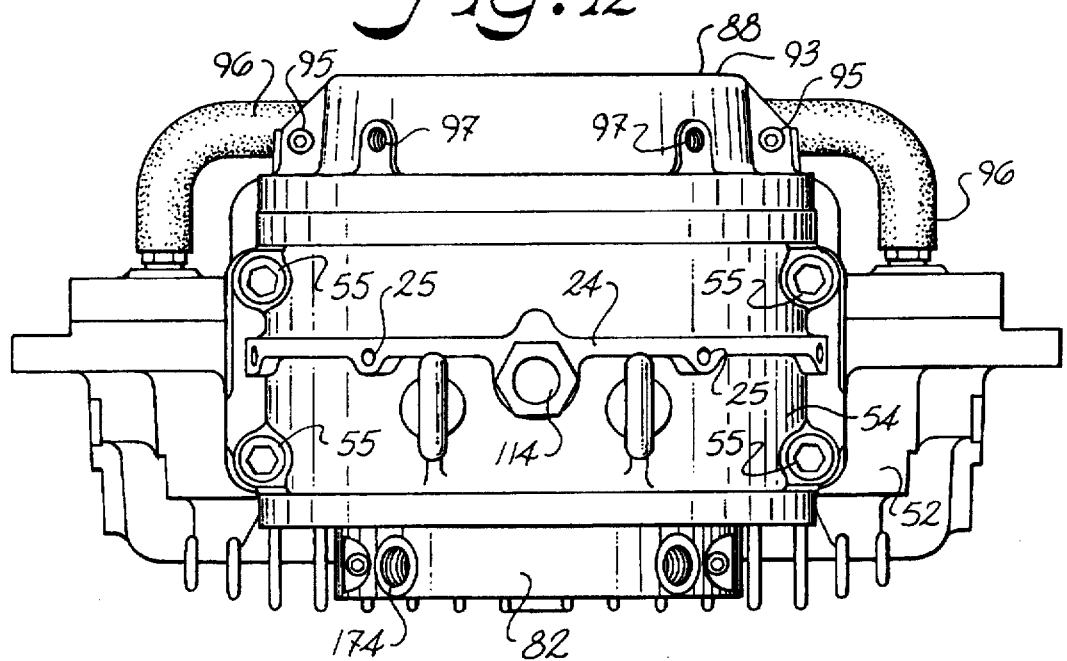
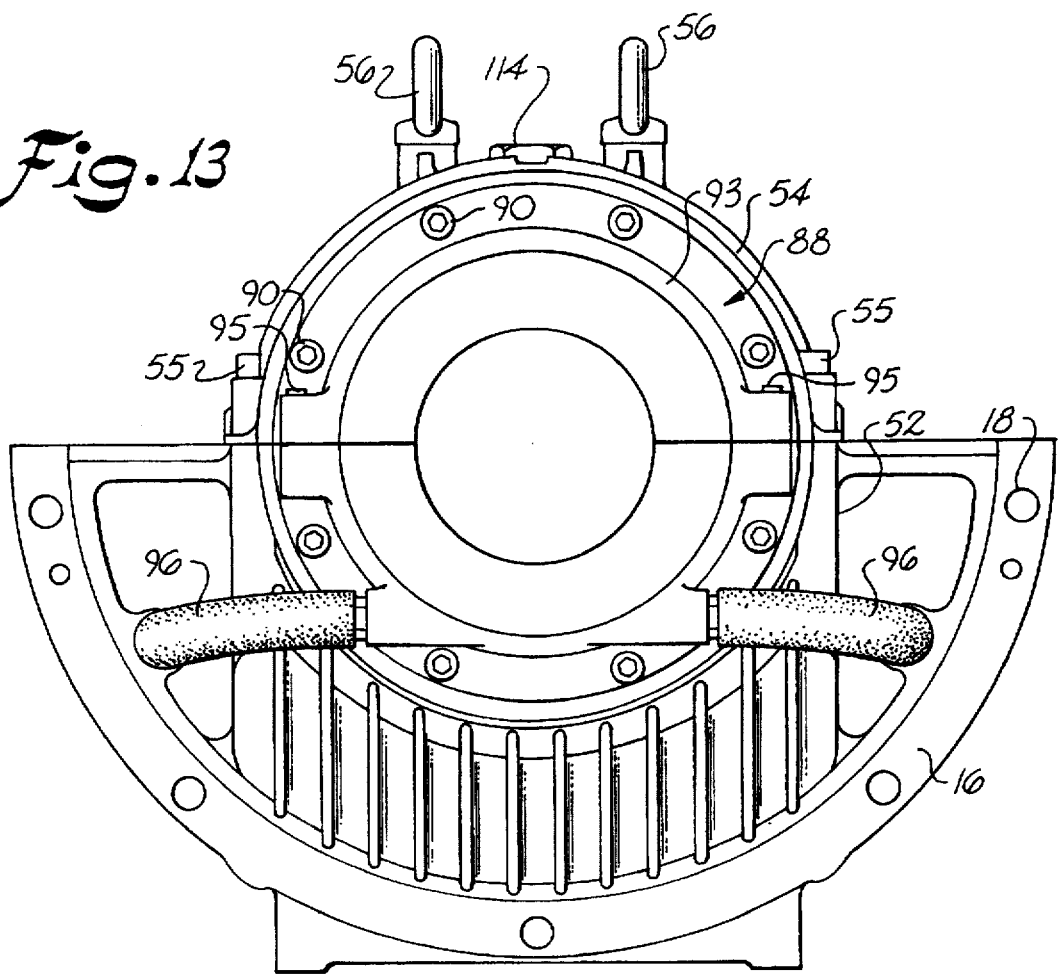

CENTER FLANGE BEARING SUITABLE FOR USE WITH ELECTRICAL MACHINERY

BACKGROUND OF THE INVENTION

The present invention relates generally to the art of bearing assemblies for supporting a rotatable shaft. More particularly, the invention relates to a bearing assembly suitable for supporting the shaft of an electrical machine.

The shaft of an electrical machine, such as a motor or generator, is often supported by a bearing assembly mounted to the machine casing. Typically, a hydrodynamic sleeve bearing in which the shaft rides on a thin film of oil is utilized for this purpose. Such bearings are often split into a lower base portion and an upper cap portion to facilitate installation.

In one known configuration, as shown in DIN standard 31694, the base portion of the bearing includes a semicircular mounting flange. The cap portion defines a radial rib to which a plate may be attached for covering any gap in the mounting hole of the machine casing. The present invention seeks to provide improvements which may be useful in constructing a bearing assembly according to DIN standard 31694, as well as bearing assemblies used in various other applications.

SUMMARY OF THE INVENTION

The present invention recognizes and addresses various disadvantages of prior art constructions and methods. Accordingly, it is an object of the present invention to provide an improved bearing assembly for supporting a rotatable shaft.

It is a more particular object of the present invention to provide an improved center flange bearing assembly.

It is a further object of the present invention to provide an improved hydrodynamic sleeve bearing.

It is a further object of the present invention to provide an improved split bearing arrangement.

Some of these objects are achieved by a bearing assembly for supporting a rotatable shaft. The bearing assembly comprises a bearing housing having a shaft receiving portion and a sump portion, with the sump portion defining a sump for containing a lubricant fluid therein. In an exemplary construction, the bearing housing defines a semicircular mounting flange along a bottom portion thereof.

A bearing liner is provided within the shaft receiving portion of the bearing housing. The bearing liner defines a shaft bore through which the rotatable shaft operatively extends. The bearing liner may be configured having first and second thrust bearing surfaces at respective opposite ends thereof and a radial bearing surface along the inside of the shaft bore.

The bearing assembly further includes first and second lubricant seals located at respective opposite axial ends of the shaft receiving portion of the bearing housing. Each of the lubricant seals includes an annular flange portion integrally extending into an extension portion having an annular seal structure, such as a labyrinthine seal structure, located on an inside thereof. The annular flange portion is connected to a respective end face of the shaft receiving portion and the extension portion is situated about the shaft. The first lubricant seal may have an inner seal diameter different than the inner seal diameter of the second lubricant seal. Alternatively, the first lubricant seal may have an inner seal diameter substantially equal to the inner seal diameter of the second lubricant seal.

In some exemplary embodiments, the first and second lubricant seals are connected to the shaft receiving portion of the bearing housing utilizing a plurality of threaded members extending through respective mounting holes defined in the annular flange portion. In particular, the threaded members may extend into respective threaded bores defined in the end face of the shaft receiving portion.

An air seal having a flanged attachment portion integrally extending into an extended seal portion may be mounted axially outboard of at least one of the lubricant seals. In this case, the attachment portion may be adjacent to the annular flange portion of the associated lubricant seal, and may be attached utilizing threaded members also used to mount the lubricant seal to the bearing housing.

In some exemplary embodiments, the extension portion of at least one of the lubricant seals may define at least one radial receiving hole for mounting a selected sensor device. For example, first and second radial receiving holes may be provided, spaced by a predetermined angular separation. The respective lubricant seal may be configured to be connected to the shaft receiving portion of the bearing housing in a plurality of angular positions to facilitate placement of the radial receiving holes in a desired location.

The annular flange portion of each of the first and second lubricant seals may define at least one lubricant fluid return path in a bottom portion thereof. In this case, the respective end faces of the shaft receiving portion may define therein at least one lubricant fluid return bore. The lubricant fluid return bore provides fluid communication between the sump and the lubricant fluid return path defined in the associated lubricant seal.

The shaft receiving portion of the bearing housing may be defined having a first axial length approximately equal to a second axial length of the bearing liner. The sump portion of the bearing housing may be defined having a third axial length greater than the first axial length. The sump portion may further define a plurality of cooling fins on either or both respective axial sides thereof.

In some exemplary constructions, the shaft receiving portion of the bearing housing includes an internal seat portion. The seat portion defines a spherical inner surface complementary to a spherical outer surface of the bearing liner to accommodate a predetermined degree of angular misalignment between the shaft and the bearing housing.

Other objects of the present invention are achieved by a bearing assembly comprising a bearing housing having a base element and a cap element matable to facilitate mounting of the bearing housing about the shaft. The base element defines a sump for containing a lubricant fluid therein and further defines a first partial shaft receiving portion. The cap element defines a second partial shaft receiving portion complementary to the first partial shaft receiving portion to produce a complete shaft receiving portion when the base element and the cap element are mated.

The bearing assembly further comprises a bearing liner contained within the complete shaft receiving portion of the bearing housing. The bearing liner defines a shaft bore through which the rotatable shaft operatively extends. The complete shaft receiving portion of the bearing housing has a first axial length approximately equal to a second axial length of the bearing liner.

In some exemplary constructions, the complete shaft receiving portion of the bearing housing includes an internal seat portion. The seat portion defines a spherical inner surface complementary to a spherical outer surface of the bearing liner to accommodate a predetermined degree of angular misalignment between the shaft and the bearing housing.

The bearing liner may comprise a first mating element and a second mating element matable to facilitate mounting of the bearing liner about the shaft. In some exemplary constructions, a nonmetallic element may be provided extending between the shaft receiving portion and the bearing liner to prevent undesirable relative rotation therebetween. A conducting mechanism, such as appropriate screw, may also be provided extending through the bearing housing into contact with the outer surface of the bearing liner to effect grounding.

The bearing liner may be configured having first and second thrust bearing surfaces at respective opposite ends thereof and a radial bearing surface along an inside of the shaft bore. The thrust bearing surfaces preferably define an annular oil channel radially spaced from the shaft bore. A plurality of radial oil channels are preferably also defined in the thrust bearing surfaces to provide fluid communication between the shaft bore and the annular oil channel.

The bearing housing may define at least one circulating oil inlet and at least one circulating oil outlet. In some exemplary embodiments, the bearing housing may define two such inlets and two such outlets, respective of which may be symmetrically located on opposite lateral sides of the bearing housing. Each of the circulating oil outlets may include an integral weir for maintaining a predetermined level of lubricant fluid in the sump.

The circulating oil inlets may extend to the spherical inner surface of the seat portion. In this case, the bearing liner may define an oil ingress bore extending from the spherical outer surface thereof to the shaft bore for providing fluid communication between the oil inlet and the shaft bore.

The bearing assembly may include an oil ring located in a ring opening defined in the bearing liner such that the oil ring operatively contacts a top portion of the shaft. The oil ring will have a diameter sufficient to extend into the sump such that rotation of the oil ring will pick up lubricant fluid from the sump and cause it to be deposited on the shaft. First and second lubricant dams may be attached to the bearing liner at respective opposite lateral locations in the ring opening. The lubricant dams are configured to confine lubricant fluid deposited on the shaft by the oil ring.

Other objects of the present invention are achieved by a bearing assembly for supporting a rotatable shaft having a bearing housing comprising a base element and a cap element matable to facilitate mounting of the bearing housing about the shaft. The base element defines a sump for containing a lubricant fluid therein and further defines a first partial shaft receiving portion. The cap element defines a second partial shaft receiving portion complementary to the first partial shaft receiving portion to produce a complete shaft receiving portion when the base element and the cap element are mated. A bearing liner defining a shaft bore through which the rotatable shaft operatively extends is contained within the complete shaft receiving portion of the bearing housing.

First and second lubricant seals are located at respective opposite axial ends of the complete shaft receiving portion of the bearing housing. Each of the lubricant seals has an attachment portion and a seal portion. The attachment portion is connected to the complete shaft receiving portion of the bearing housing, with the seal portion extending about the rotatable shaft.

The attachment portions of the lubricant seals further define at least one lubricant fluid return path in a bottom portion thereof. Respective end faces of the complete shaft receiving portion each define therein at least one lubricant fluid return bore providing fluid communication between the sump and a lubricant fluid return path defined in an associated of the lubricant seals.

Other objects of the present invention are achieved by a bearing assembly for supporting a rotatable shaft comprising a bearing housing having a shaft receiving portion. A bearing mechanism is located within the shaft receiving portion of the bearing housing and defines a shaft bore through which the rotatable shaft operatively extends. First and second lubricant seals are located at respective opposite axial ends of the shaft receiving portion.

Each of the lubricant seals includes an annular flange portion integrally extending into an extension portion having an annular seal structure located on an inside thereof. The annular flange portion is connected to a respective end face of the shaft receiving portion, with the extension portion being situated about the shaft.

The extension portion of at least one of the lubricant seals defines therein at least one radial receiving hole for mounting a selected sensor device. In an exemplary construction, first and second radial receiving holes are provided, spaced by a predetermined angular separation. In this case, each receiving hole may have a sensor device mounted therein, such as a sensor situated to detect vibration of the rotatable shaft. The lubricant seal having the sensor devices may be configured to facilitate connection to the shaft receiving portion in a plurality of angular positions.

Other objects, features and aspects of the present invention are provided by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIG. 4 is an assembly view illustrating the bearing liner and base element of the bearing assembly of FIG. 2;

FIG. 4A is a fragmentary view illustrating an integral weir defined in a circulating oil outlet of the bearing assembly of FIG. 2;

FIG. 10 is an enlarged sectional view of the area so indicated in FIG. 2;

FIGS. 11A–11C illustrate the use of different lubricant seals to accommodate respective shaft diameters;

FIG. 12 is a top plan view of the bearing assembly illustrated in FIG. 2; and

FIG. 13 is a back elevational view of the bearing assembly illustrated in FIG. 2.

Figure 1:
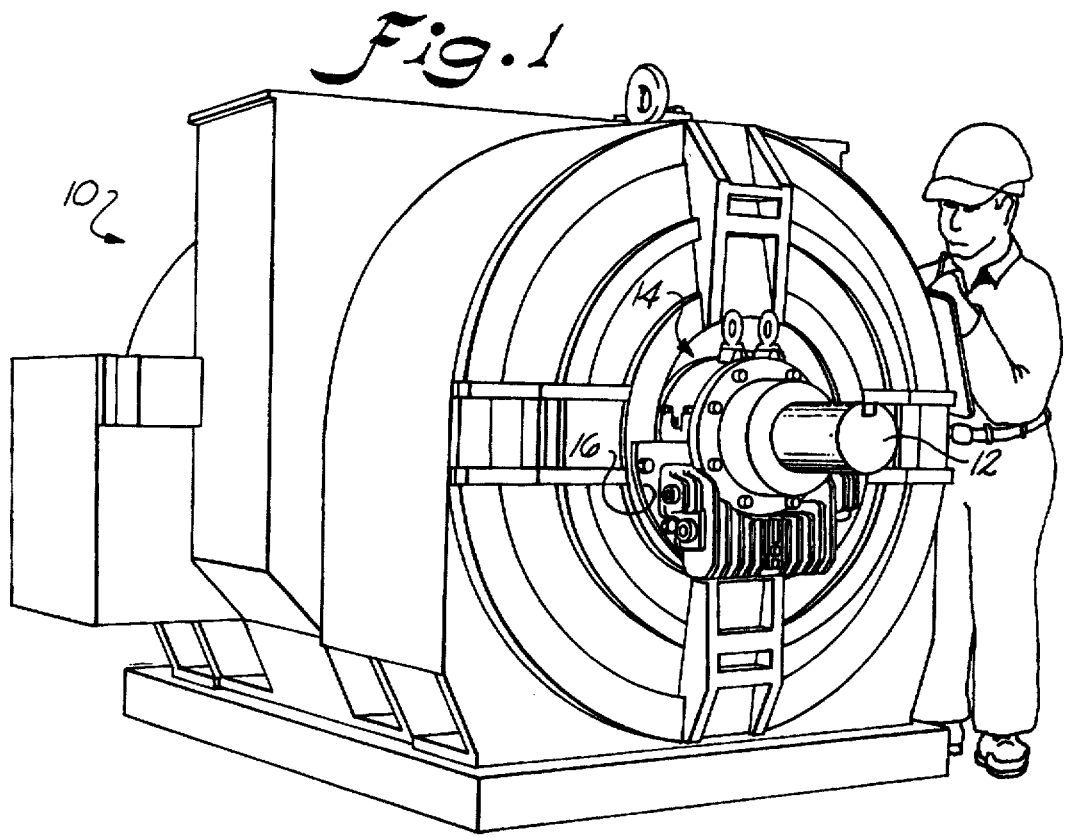
FIG. 1 is a perspective view of an electrical machine having an improved bearing assembly constructed in accordance with the present invention supporting a rotatable shaft thereof.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates a relatively large electromechanical machine 10 having a shaft 12 extending therefrom. Typically, machine 10 may be either a generator or an electric motor. In the case of a generator, shaft 12 would serve as the input for mechanical power which is converted to electricity. In the case of an electric motor, shaft 12 would serve as a mechanical output. As can be seen, shaft 12 is rotatably supported by a bearing assembly indicated generally at 14.

Figure 2:
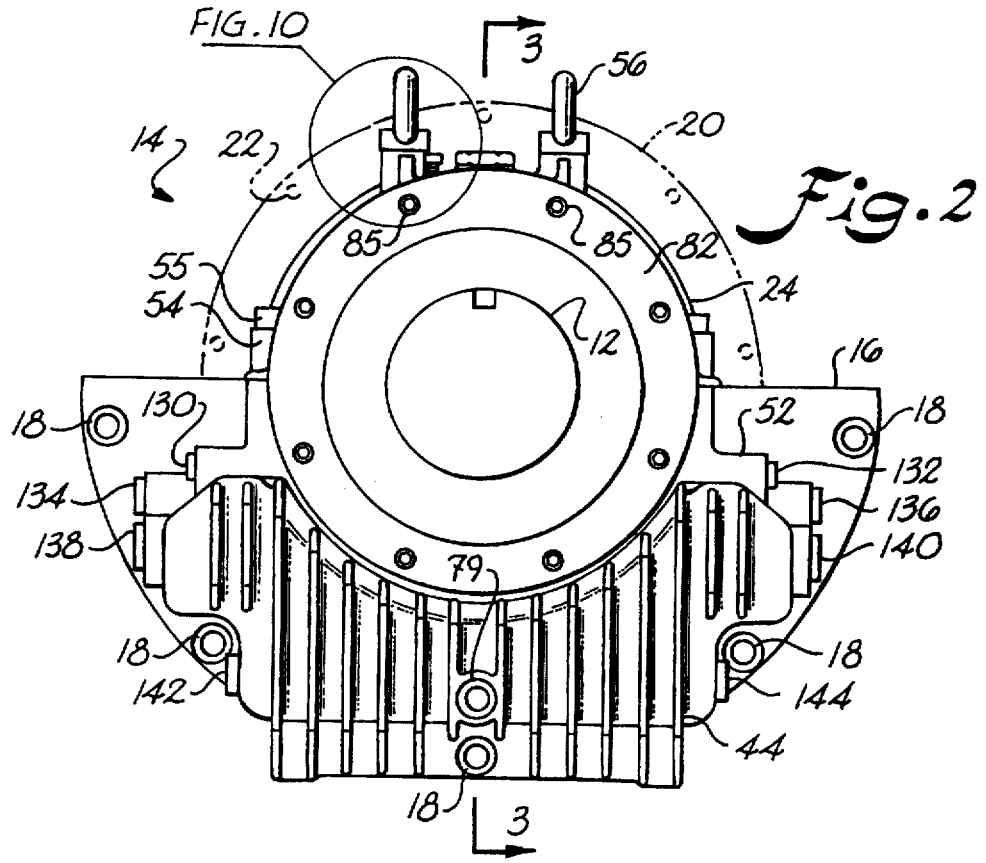
FIG. 2 is a front elevational view of an improved bearing assembly constructed in accordance with the present invention.

Referring now also to FIG. 2, bearing assembly 14 includes an integral flange 16 to facilitate mounting to the casing of machine 10. Flange 16 defines a series of spaced apart holes 18 through which respective mounting bolts may be inserted. In the illustrated embodiment, flange 16 is constructed in accordance with DIN standard 31694, and is semicircular.

Because the mounting hole defined in the casing of machine 10 is often circular, a gap may be defined between the housing of bearing assembly 14 and the machine casing in the region above flange 16. This gap provides access to the backside of bearing assembly 14 for installation and maintenance. A cover plate constructed of sheet metal or the like may be used to cover this gap during use.

In one exemplary embodiment, bearing assembly 14 includes a radial rib 20 having a semicircular extent. Radial rib 20 is constructed in a manner similar to prior art designs, including a plurality of spaced apart axial mounting holes 22 to which the cover plate may be attached. It will be appreciated that rib 20 protrudes somewhat into the gap above bearing assembly 14. As a result, radial rib 20 may impede access to the backside of bearing assembly 14, the motor side seals and housing cap bolts.

Figure 3:
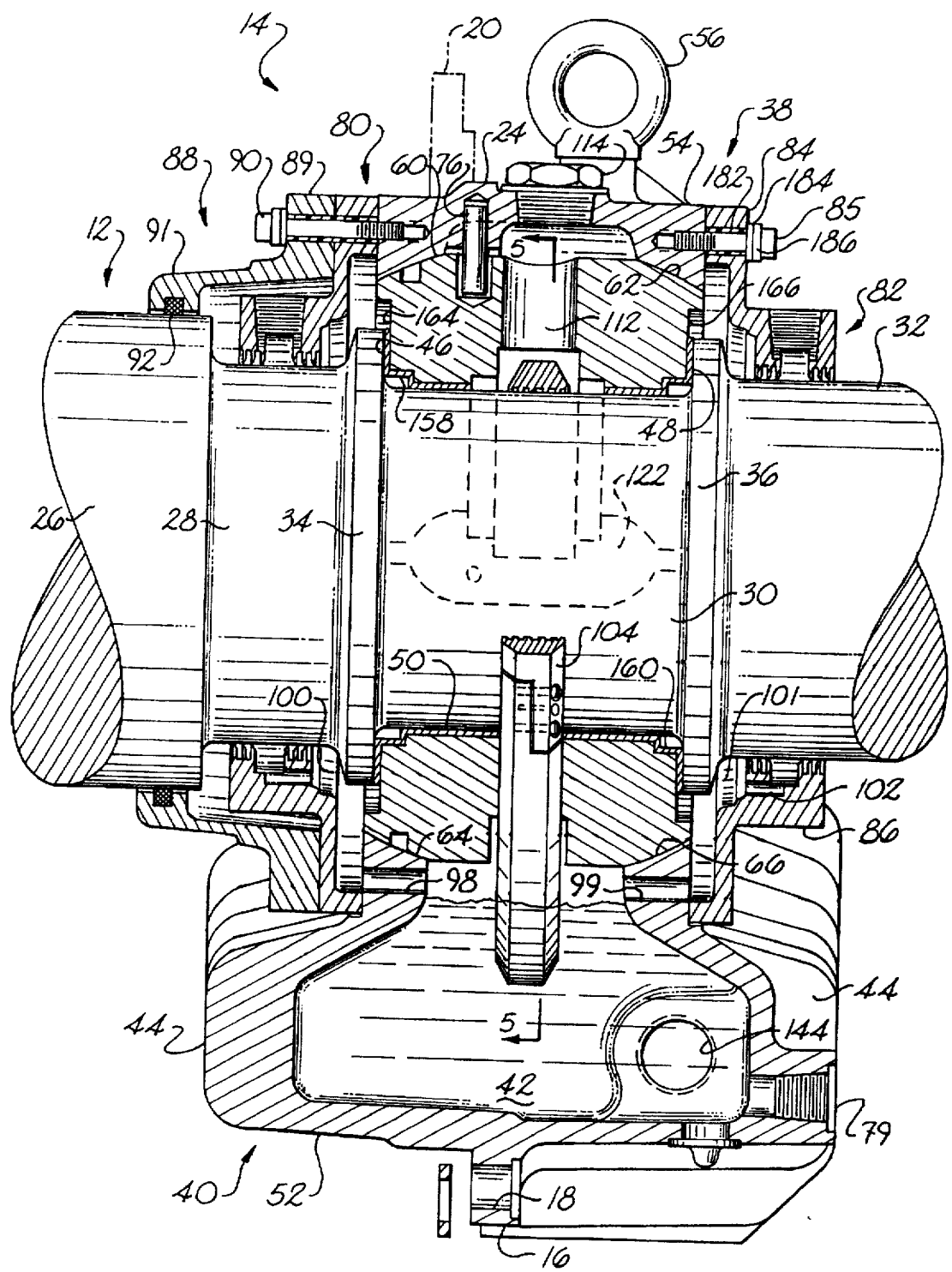
FIG. 3 is a partial cross-sectional view as taken along line 3—3 of FIG. 2.

To alleviate this difficulty, radial rib 20 is omitted in some exemplary embodiments of the invention. In such embodiments, bearing assembly 14 may be equipped with a smaller mounting ledge 24. As shown in FIG. 12, ledge 24 defines a plurality of spaced apart radial mounting holes 25 for attachment of a modified cover plate. Ledge 24 is located at an axial position slightly offset from that of rib 20, as shown in FIG. 3.

The construction of bearing assembly 14 will now be described in detail with continuous reference to FIG. 3 and other drawings as indicated. As can be seen in FIG. 3, shaft 12 is configured having a number of distinct portions, each of which may have a different diameter. For example, first portion 26, which extends from the inside of machine 10, may have a larger diameter than second portion 28. Second portion 28 extends into third portion 30, which may have a yet smaller diameter. The output of shaft 12 is represented by fourth portion 32. In this case, the diameter of fourth portion 32 and second portion 28 are the same, although they may be different as will be described below. Shaft 12 includes a pair of flanges 34 and 36 defining opposing thrust faces at each axial end of third portion 30.

The housing of bearing assembly 14 includes an upper shaft receiving portion 38 extending into a lower sump portion 40. As can be seen, sump portion 40 defines a sump therein for maintaining a lubricant fluid (indicated at 42). The lubricant fluid will typically be an oil suitable for producing an appropriate hydrodynamic film within the shaft bore, as well as facilitating cooling of bearing assembly 14. Fins 44 are defined on both axial sides of the sump for dissipation of heat which accrues in the lubricant fluid 42 during operation.

Shaft receiving portion 38 contains therein a suitable bearing liner for facilitating rotation of shaft 12. In this case, the bearing liner is configured having a pair of opposed thrust bearing surfaces 46 and 48 for operative cooperation with the respective thrust faces of flanges 34 and 36. A radial bearing surface 50 extends through the shaft bore defined within the bearing liner. Preferably, the bearing surfaces comprise a lining of babbitt metal or a suitable sleeve bearing material. While bearing 14 is constructed having thrust bearing surfaces 46 and 48, it is to be understood that various expansion bearings may also be constructed in accordance with the present invention.

Referring now also to FIGS. 2, 12 and 13, the housing of bearing assembly 14 is split into a base element 52 and a cap element 54 to facilitate installation. Base element 52 includes the sump portion 40 of the bearing housing, as well as the bottom half of shaft receiving portion 38. Cap element 54 includes the upper portion of shaft receiving portion 38. To install bearing assembly 14, base element 52 is thus positioned using mounting flange 16, with shaft 12 being cradled therein. Cap element 54 is then lowered about shaft 12, such as using eye bolts 56. After cap element 54 is positioned on base element 52, the elements are secured using a plurality of assembly bolts 55.

As can be seen in FIGS. 3 and 4, the bearing liner is constructed to accommodate a predetermined degree of angular misalignment between shaft 12 and the housing of bearing assembly 14. Specifically, the bearing liner comprises an insert 58 received in a complementary seat defined in the shaft receiving portion 38 of the bearing housing. The outer surface of insert 58 defines spherical regions 60 and 62 for cooperating with respective spherical surfaces 64 and 66 defined in the bearing housing.

To facilitate installation, insert 58 is constructed having two mating elements 68 and 70 joined together, in this case using bolts 72. A dowel 76 is secured in a hole defined on the inside of cap element 54. In addition, insert 58 defines a hole 74 in its top surface for receipt of a dowel 76 therein. Hole 74 is configured to prevent relative rotation between insert 58 and the bearing housing during use while accommodating a slight angular misalignment between shaft 12 and the bearing housing. Preferably, dowel 76 is made from nonmetallic material to enhance electrical isolation between the bearing housing and insert 58.

As shown in FIG. 4, eye bolts 56 may also be utilized to facilitate lifting of base element 52. For example, the assembly holes 77 used to receive assembly bolts 55 may be sized to also receive eye bolts 56. In addition, base element 52 may define asymmetrical alignment holes 78 for receiving dowels depending from cap element 54. The combination of the asymmetrical holes and dowels facilitates installation of cap element 54 in the correct orientation.

As shown in FIG. 3, the overall axial length of the bearing liner is approximately the same as the axial length of shaft receiving portion 38. In other words, the axial length of the bearing housing around shaft 12 has been minimized to approximately that of the bearing liner. This is in contrast to many prior art designs in which the axial length of the bearing housing about the shaft has been significantly greater than that of the bearing liner. Among other advantages, the design disclosed herein often permits cap element 54 to be lighter than would otherwise be the case. It will be appreciated that a reduction in the weight of cap element 54 will facilitate installation and maintenance of bearing assembly 14. In embodiments where radial rib 20 is omitted, the weight of cap element 54 is reduced even further.

The external axial length (excluding fins 44) of sump portion 40 is greater than that of shaft receiving portion 38. Preferably, the cooling fins on the outboard side of sump portion 40 extend past the parting line of the casting mold, giving base element 52 better stability against tipping when it is not installed on shaft 12. The mounting tenon directly behind flange 16 preferably has a sufficient width to accommodate one or shims, such as the shim shown in FIG. 3. These shims allow the user to adjust for the magnetic center of the rotor in the stator of the electromechanical machine.

Internally, the sump is configured having a relatively simple geometry, with no internal ribbing and an unimpeded line of sight. In addition, the sump is internally sloped to a single sump drain 79 located at its center. This geometry allows a simple one-piece core that facilitates casting. Painting and cleaning of base element 52 are also made easier by this configuration.

The unimpeded design of sump portion 40 shown in the illustrated embodiment maintains a relatively large volume of lubricant fluid. This feature, in addition to fins 44 on both sides of sump portion 40, enhances overall cooling capacity. As a result, it may be possible to forego auxiliary cooling systems in some situations where such may have been necessary using certain prior art bearings.

Bearing assembly 14 includes oil seals 80 and 82 mounted at respective axial ends of shaft receiving portion 38. Each of the oil seals includes an annular flange portion, such as flange portion 84 of oil seal 82, connected to the respective end face of shaft receiving portion 38. In exemplary embodiments, the flange portions are connected utilizing a plurality of screws, such as screws 85, extending into threaded bores defined in the respective end face of shaft receiving portion 38.

The annular flange portions integrally extend into a respective extension portion, such as extension portion 86 of oil seal 82, having an annular seal structure located on an inside thereof. The extension portions are situated about shaft 12 such that the seal structure will inhibit escape of lubricant fluid from inside of the bearing housing. In the illustrated embodiment, the seal structure is configured as a labyrinthine seal structure. In some situations, it may be desirable to use other seal configurations, such as various floating seals and the like.

As shown, an air seal 88 may be situated axially outboard of oil seal 80. Air seal 88 is constructed having a flanged attachment portion 89 adjacent to the annular flange portion of seal 80. Preferably, such attachment may be effected using screws 90 also utilized to connect seal 80 to the end face of shaft receiving portion 38. It will be noted that screws 90 have a length greater than that of screws 85 to accommodate the width of flanged attachment portion 89.

Attachment portion 89 of air seal 88 integrally extends into extended seal portion 91 situated about the first portion 26 of shaft 12. Extended seal portion 91 includes an annular groove for receiving therein a seal packing 92 which rides in contact with the shaft's outer surface.

Referring now to FIGS. 12 and 13, air seal 88 is constructed of complementary semicircular elements 93 and 94 appropriately joined together, such as by tangential bolts 95. A pair of hoses 96 extend between the interior of air seal 88 and the bearing housing, as shown. In this manner, air seal 88 functions to equalize pressure differentials which may otherwise develop between the regions inside and outside of the bearing housing. Radial taps 97 may be defined in seal portion 91 to facilitate connection of a manometer, when desired.

As can be seen in FIG. 4, the end faces of shaft receiving portion 38 each define return bores providing fluid communication with the sump. Specifically, the inside end face defines a series of return bores 98. Likewise, the outside end face defines therethrough a series of return bores 99. These return bores allow lubricant fluid outside the respective end faces to drain back into the sump.

As can be seen in FIG. 3, the flange portions of oil seals 80 and 82 define respective lubricant return paths 100 and 101 in a bottom portion thereof. Lubricant return paths 100 and 101 provide fluid communication to the associated of return bores 98 and 99. In other words, lubricant fluid that has circulated to the area outside the end faces of shaft receiving portion 38 will drain back into the sump through a respective return path and its associated return bore. The extension portion of each oil seal preferably defines at least one axial channel, such as axial channel 102 of oil seal 82, that allows lubricant fluid captured by the seal structure to flow into the associated return path.

In the illustrated embodiment, bearing assembly 14 is equipped with an oil ring 104 to provide a supply of lubricant fluid from the sump to the bearing liner. As can be seen most clearly in FIGS. 4 and 5, oil ring 104 extends about shaft 12 through an axial opening 106 defined in insert 58. Oil ring 104 has a diameter, however, large enough to dip sufficiently into the sump. Because oil ring 104 contacts the top of shaft 12, rotation of shaft 12 will cause rotation of oil ring 104. In this manner, lubricant fluid will be lifted from the sump and deposited on shaft 12 to maintain the desired hydrodynamic film in the shaft bore.

Figure 6:
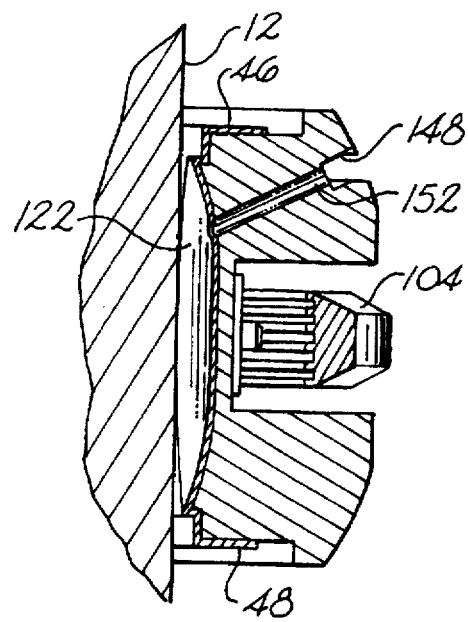
FIG. 6 is a fragmentary cross-sectional view as taken along line 6—6 of FIG. 5.

In the illustrated embodiment, oil ring 104 is constructed of two semicircular elements 108 and 110 appropriately joined together, such as by the axial screws and dowels shown. As shown in FIG. 6, the inner surface of oil ring 104 preferably defines a plurality of annular channels to facilitate lifting of the lubricant fluid from the sump. Exemplary configurations for these annular channels are shown in U.S. Pat. No. 4,674,894, incorporated herein by reference.

Insert 58 may define a through-bore 112 directly above the location in which oil ring 104 contacts shaft 12. A sight glass 114 may be provided in the top of cap element 54 in suitable alignment with through-bore 112 so that rotation of oil ring 104 can be visually checked during operation.

In the illustrated construction, respective oil dams 116 and 118 are provided on opposite lateral sides of shaft 12. Oil dams 116 and 118 function to direct lubricant fluid deposited on top of shaft 12 into an associated axial channel 120 and 122 extending along the inside surface of the shaft bore. Axial channels 120 and 122 allow the lubricant fluid to flow along the length of the bearing liner, thus facilitating even distribution of lubricant fluid about shaft 12.

Figure 5:
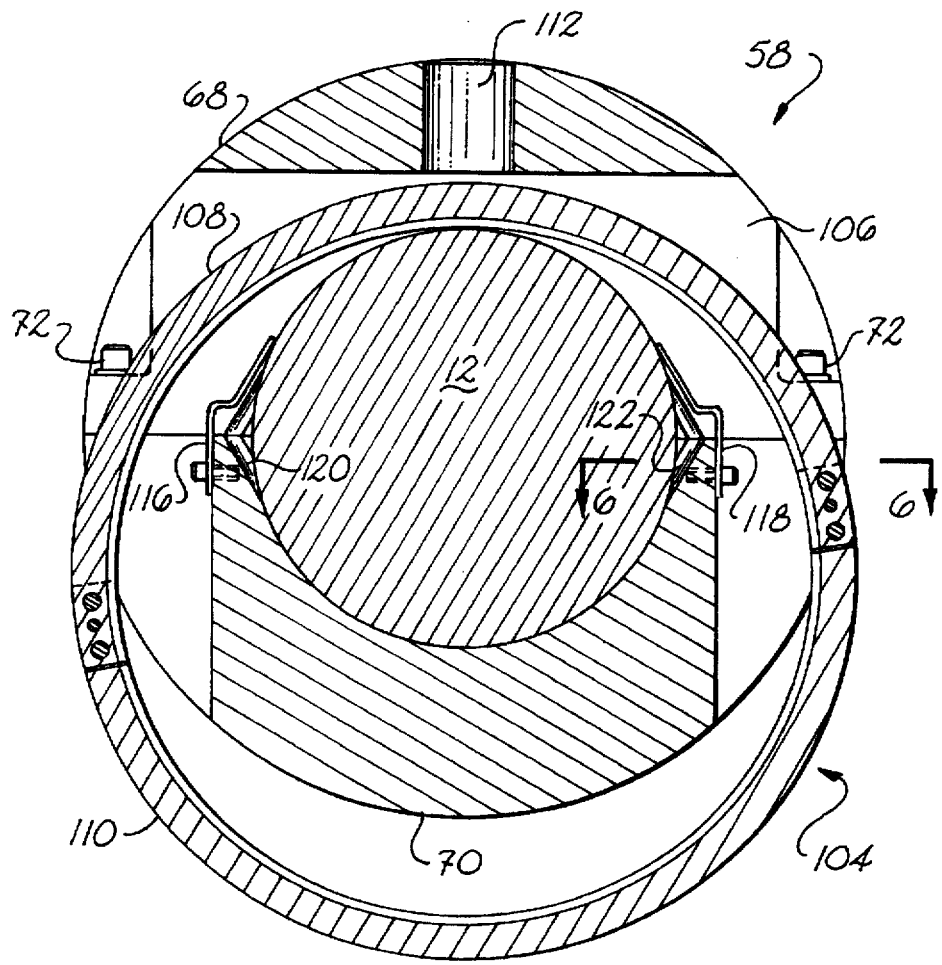
FIG. 5 is a cross-sectional view as taken along line 5—5 of FIG. 3.
Figure 5A:
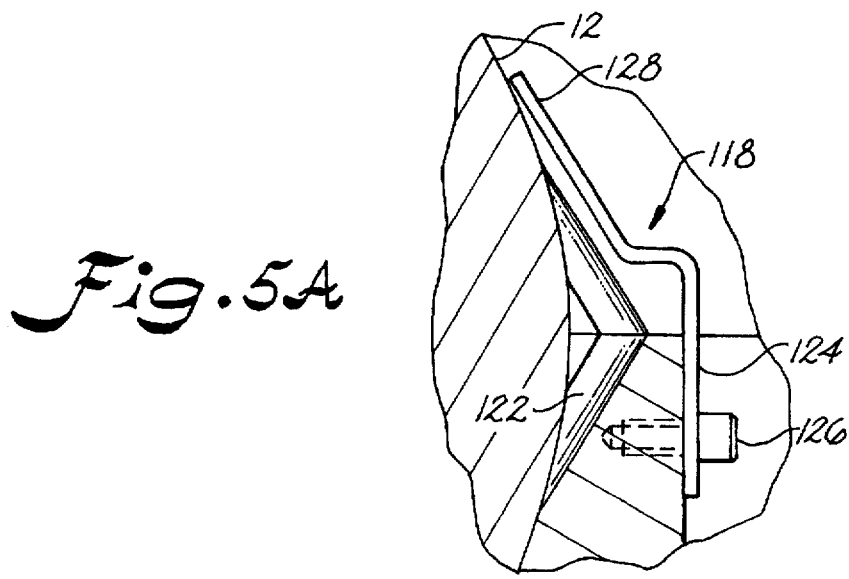
FIG. 5A is an enlarged fragmentary view illustrating the lubricant dam shown in FIG. 5.

FIG. 5A shows an enlarged view of oil dam 118, although it should be understood that oil dam 116 would be similarly constructed. Oil dam 118 includes a lower portion 124 attached to insert 58, such as by screw 126. An upper portion 128 integrally extends from lower portion 124 to a location adjacent the outer surface of shaft 12.

As can be seen in FIGS. 2 and 4, base element 52 defines a number of ports for connection to external systems. Preferably, all of the necessary ports are provided on a single lateral side of the bearing housing. In this case, an additional set of ports may be symmetrically located on the opposite lateral side of the bearing housing. This arrangement provides flexibility in connecting the external systems when bearing assembly 14 is installed for use.

In the illustrated embodiment, each such set includes a total of five ports. Respective inlets 130 and 132 are provided for connection to a source of circulating oil. Ports 134 and 136 may receive a respective temperature probe or the like. Outlets through which oil may drain in a circulating oil system are indicated at 138 and 140. As shown in FIG. 4, either of outlets 138 and 140 may be plugged with a sight glass 141 when not in use so that the level of lubricant fluid within the sump can be easily monitored. Lower ports 142 and 144 may also be provided for receipt of a heater, thermostat, or cooler within the sump.

Figure 4B:
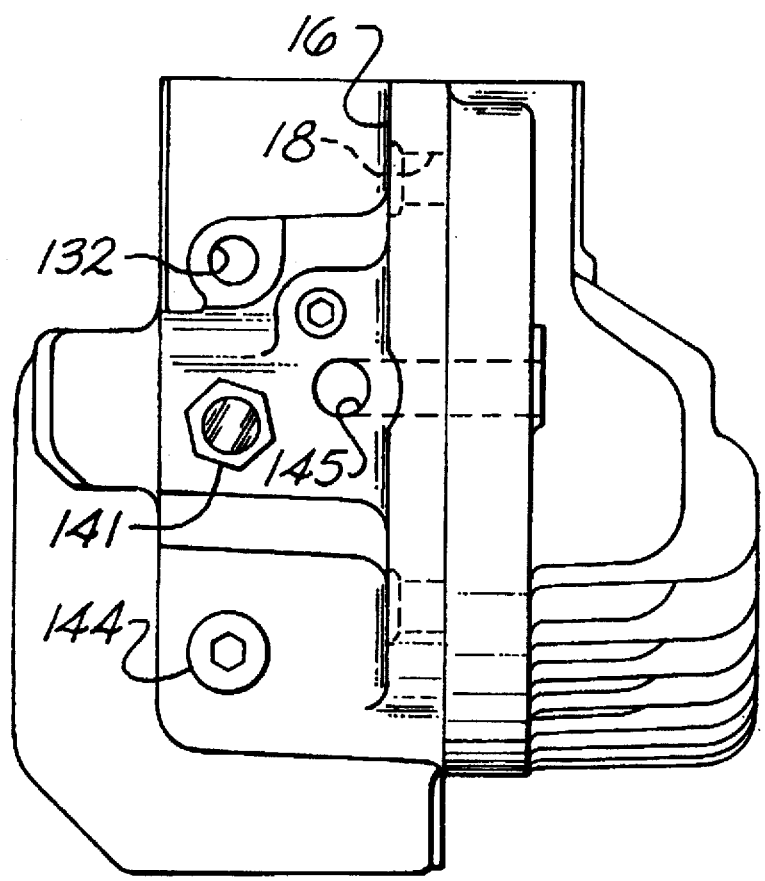
FIG. 4B is a side elevation of the base element shown in FIG. 4.

The fifth port in each symmetrical set provides fluid communication to air seal 88. For example, as shown in FIG. 4B, port 145 terminates a fluid passage extending through mounting flange 16 to the motor side of bearing assembly 10. A fitting is typically threaded into the passage at this location for attachment of a respective air hose 96. As can be seen, port 145 is not perpendicular to the rest of the ports in the set. This will often facilitate piping in the field, since parallel hoses will not intersect.

Inlets 130 and 132 each define a fluid passage extending to spherical surface 66, such as passage 146 shown in FIG. 4. It will be appreciated that these fluid passages register with an annular groove 148 defined in spherical region 62 of insert 58. Insert 58, in turn defines respective ingress bores 150 and 152 extending from annular groove 148 to associated of axial channels 120 and 122. The configuration of ingress bore 152 may be seen most clearly in FIG. 6.

Each of the circulating oil outlets may define therein an integral weir for maintaining the desired oil level when a circulating oil system is utilized. In many prior art designs, a weir has been incorporated into a pipe fitting threaded into the outlet. This pipe fitting must be clocked exactly and is tightened in whole turn increments if it is found to leak.

FIG. 4A illustrates an integral weir 154 incorporated into outlet 140. As can be seen, a drain-back hole 155 is defined in a bottom portion of weir 154. Drain-back hole 155 prevents oil from being trapped between weir 154 and sight glass 141 when a circulating oil system is not used. It should be appreciated that the weir incorporated into outlet 138 would be similarly constructed.

Much of the oil supplied to axial channels 120 and 122 will serve to directly generate the desired oil film on radial bearing surface 50. Thrust bearing surfaces 46 and 48 will be lubricated largely due to oil being "squeezed" from radial bearing surface 50. Additional oil to lubricate thrust bearing surfaces 46 and 48 will be supplied by smaller axial passages, such as axial passage 156 (FIG. 4), located at respective axial ends of axial channels 120 and 122. These axial passages provide fluid communication with respective annular oil distribution channels 158 and 160 located at opposite axial ends of insert 58. The lubricant fluid then flows into a series of radial passages, such as passages 162, defined in the thrust face. Some of this oil flows directly into respective outer annular oil channels 164 and 166 through respective bleeder slots. Most of the oil is distributed over the thrust face, eventually flowing out to oil channels 164 and 166. The semicircular regions adjacent the radial passages represent slight tapered regions to admit oil to the bearing surfaces 46 and 48. From outer grooves 164 and 166, the lubricant fluid may drain back into the bearing sump through respective return bores 98 and 99 via return paths 100 and 101.

Figure 7:
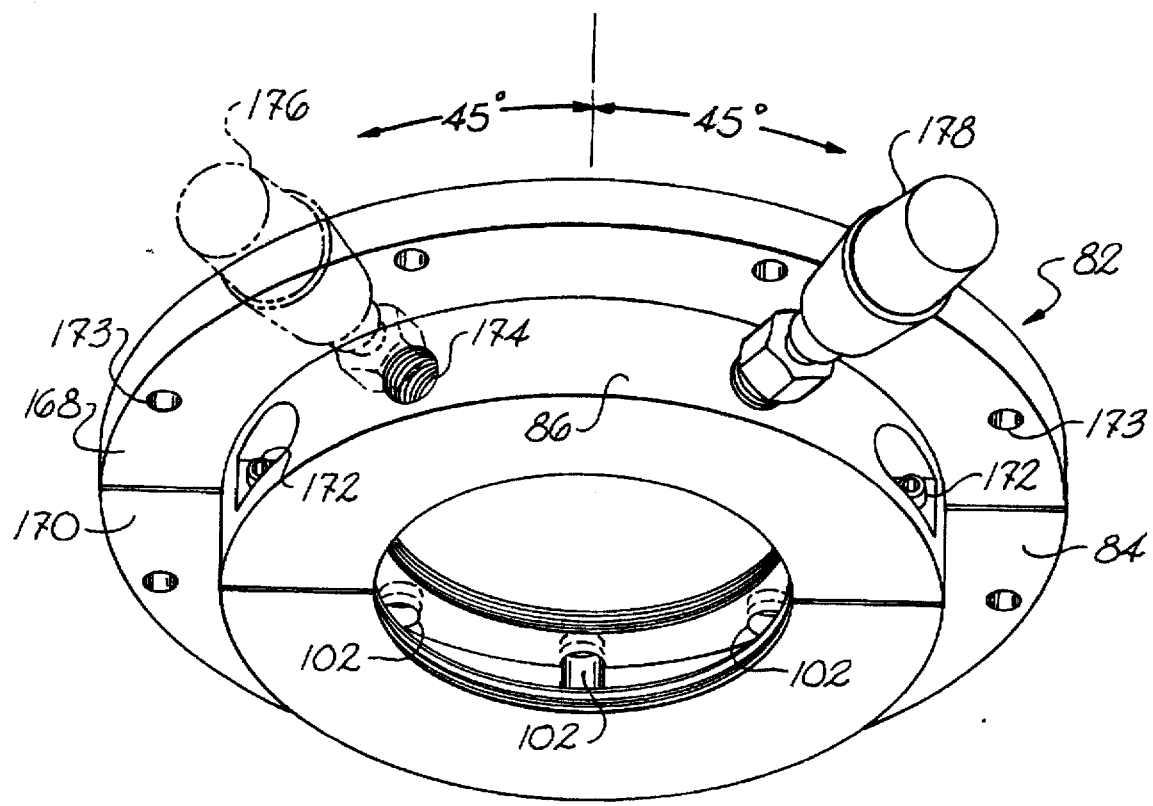
FIG. 7 is an isometric view from above showing a lubricant seal such as may be utilized in the bearing of FIG. 2.
Figure 8:
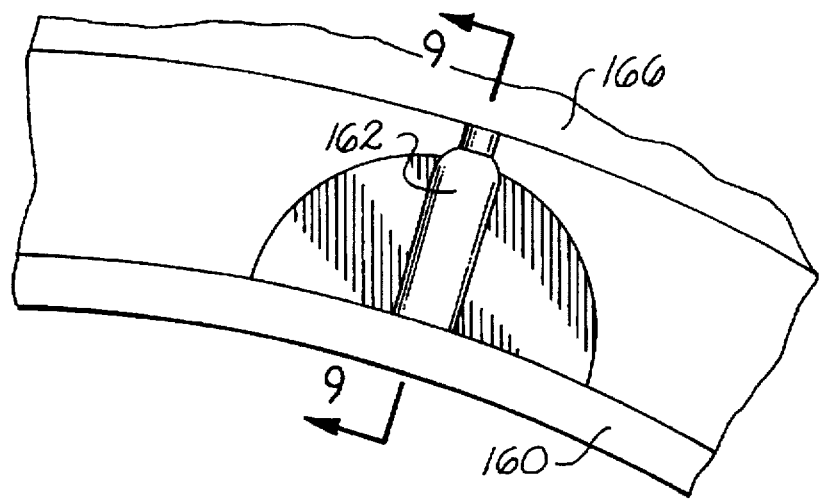
FIG. 8 is an enlarged fragmentary view of a portion of a thrust face of the bearing liner utilized in the bearing of FIG. 2.
Figure 9:
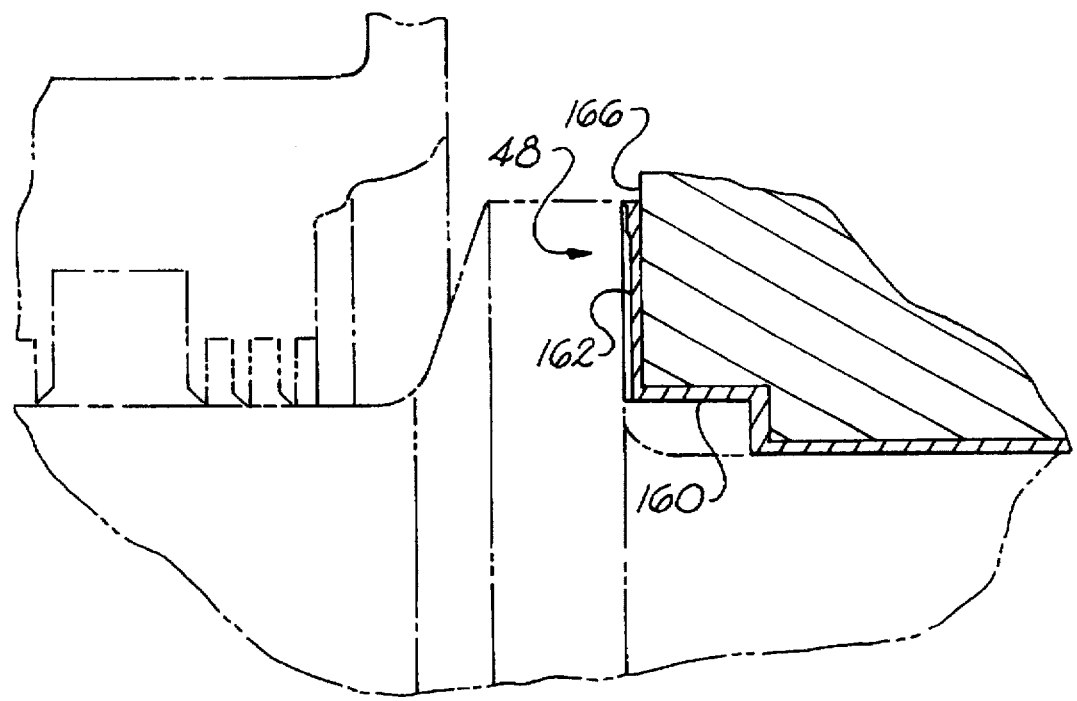
FIG. 9 is a fragmentary cross-sectional view as taken along line 9—9 of FIG. 8.

The construction of oil seals 80 and 82 may be easily explained with reference to FIG. 7. Seal 82 is specifically illustrated, although it should be understood that seal 80 may be similarly constructed. As with other parts of bearing assembly 14 that are received about shaft 12, seal 82 comprises two semicircular elements 168 and 170 joined in this case by tangential attachment screws 172. Spaced apart holes 173 are defined in flange portion 84 for receipt of screws 85 therein.

As shown, extension portion 86 may define one or more radial holes, such as hole 174, for maintaining a selected sensor device. In the illustrated embodiment, extension portion 86 defines two such radial holes spaced apart by an angle of 90°. It should be appreciated, however, that other suitable angles may also be utilized, depending on the exigencies of a particular application. Due to the configuration of extension portion 86, these radial holes may allow the use of a housed sensor conforming to NEMA standards. Selected sensor devices, such as vibration sensors 176 and 178, may be received in respective of these holes.

Seals 80 and 82 may be connected to the respective end faces of shaft receiving portion 38 in a variety of angular orientations. Because the attachment screws are spaced by 45° in the illustrated embodiment, the seals may be clocked in 45° increments. This can be especially advantageous when relatively large sensors are utilized, such as the vibration sensors illustrated. In other words, the sensor position can be changed depending on the exigencies of a particular application. It may be desirable to provide multiple axial channels in the bottom of the seal, such as multiple axial channels 102, to ensure that an axial channel will always be located at the bottom of the seal notwithstanding a shift in angular orientation.

Particularly due to the environment in which assembly 14 will often be utilized, it is desirable to electrically isolate insert 58 from the bearing housing. In this regard, spherical surfaces 64 and 66 of the bearing housing are preferably coated with a suitable insulator material.

In addition, it will often be desirable to test the integrity of this electrical insulation during use or to otherwise provide grounding for the bearing liner. Thus, as shown in FIG. 10, bearing assembly 14 preferably includes a suitable member, such as screw 180, which may be selectively moved into and out of engagement with the outer surface of insert 58. This is in contrast to many prior art designs which utilized a relatively fragile grounding wire or strap. Screw 180 may also be constructed as a spring-loaded screw, if desired.

One or more of the various seals may also be electrically isolated from the bearing housing. For example, an appropriate annular gasket may be provided between the annular flange portion of oil seal 80 and the end face of shaft receiving portion 38 to electrically isolate oil seal 80 and air seal 88 from the bearing housing. Similarly, a gasket may be situated between annular flange portion 84 and the opposite end face of shaft receiving portion 38 to electrically isolate oil seal 82.

The screws used to retain the seals will generally be metallic. To prevent the seal insulation from being shorted, these screws may be surrounded with insulating bushings, such as Teflon bushing 182 surrounding screw 85. In addition, insulating washers, such as phenolic washer 184, may be provided inboard of a metallic washer, such as washer 186, that directly contacts the screw head.

Another advantage of the present invention is illustrated in FIGS. 11A–11C. Specifically, the design of the illustrated embodiment accommodates various shaft diameters using a single bearing housing. For example, the respective diameters of second portion 28 and fourth portion 32 of shaft 12 may be varied over a wide range by merely changing the oil seal used at each location.

FIG. 11A illustrates an embodiment in which a seal 82a is situated about a shaft portion 32a having a relatively small diameter. In FIG. 11B, a seal 82b accommodates a shaft portion 32b having a slightly larger diameter. A shaft portion 32c having an even larger diameter is accommodated in FIG. 11C by a seal 82c. In each case, the outer diameter of the respective seal remains the same since the dimensions of shaft receiving portion 38 have not changed.

Preferably, the various threaded fasteners utilized in bearing assembly 10 may be vibration resistant to inhibit loosening during use. Examples of suitable vibration-resistant fasteners are those utilizing patch locks or elliptical threads. Prior art designs generally utilized standard fasteners, with and without thread-locking compound.

It can be seen that the present invention provides bearing assemblies having many advantages when compared with prior art constructions and methods. While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A bearing assembly for supporting a rotatable shaft, said bearing assembly comprising:

a bearing housing having a shaft receiving portion and a sump portion, said sump portion defining a sump for containing a lubricant fluid therein;

a bearing liner within said shaft receiving portion of said bearing housing, said bearing liner defining a shaft bore through which said rotatable shaft operatively extends;

first and second lubricant seals located at respective opposite axial ends of said shaft receiving portion of said bearing housing, each of said lubricant seals including an annular flange portion integrally extending into an extension portion having an annular seal structure located on an inside thereof, said annular flange portion being connected to a respective end face of said shaft receiving portion and said extension portion being situated about said shaft.

2. A bearing assembly as set forth in claim 1, wherein said first lubricant seal has an inner seal diameter different than an inner seal diameter of said second lubricant seal.

3. A bearing assembly as set forth in claim 1, wherein said first lubricant seal has an inner seal diameter substantially equal to an inner seal diameter of said second lubricant seal.

4. A bearing assembly as set forth in claim 1, wherein said first and second lubricant seals are connected to said shaft receiving portion of said bearing housing utilizing a plurality of threaded members extending through respective mounting holes defined in said annular flange portion and into respective threaded bores defined in said end face of said shaft receiving portion.

5. A bearing assembly as set forth in claim 4, further comprising an air seal mounted axially outboard of at least one of said first and second lubricant seals, said air seal having a flanged attachment portion integrally extending into an extended seal portion, said attachment portion being adjacent to said annular flange portion of said one of said first and second lubricant seals.

6. A bearing assembly as set forth in claim 5, wherein said flanged attachment portion of said air seal defines a plurality of mounting holes and wherein said air seal is connected to said shaft receiving portion of said bearing housing utilizing said threaded members.

7. A bearing assembly as set forth in claim 5, wherein at least one of said air seal and said first and second lubricant seals is electrically isolated from said bearing housing.

8. A bearing assembly as set forth in claim 1, wherein said extension portion of at least one of said first and second lubricant seals defines therein at least one radial receiving hole for mounting a selected sensor device.

9. A bearing assembly as set forth in claim 8, wherein said at least one radial receiving hole comprises first and second radial receiving holes spaced by a predetermined angular separation.

10. A bearing assembly as set forth in claim 9, wherein said at least one of said lubricant seals is configured to be connected to said shaft receiving portion of said bearing housing in a plurality of angular positions.

11. A bearing assembly as set forth in claim 1, wherein said annular seal structure of said first and second lubricant seals is configured as a labyrinthine seal structure.

12. A bearing assembly as set forth in claim 1, wherein said flange portion of each of said first and second lubricant seals defines at least one lubricant fluid return path in a bottom portion thereof.

13. A bearing assembly as set forth in claim 12, wherein said respective end faces of said shaft receiving portion each define therein at least one lubricant fluid return bore providing fluid communication between said sump and said lubricant fluid return path defined in an associated of said lubricant seals.

14. A bearing assembly as set forth in claim 1, wherein said shaft receiving portion has a first axial length and said bearing liner has a second axial length, said first axial length being approximately equal to said second axial length.

15. A bearing assembly as set forth in claim 14, wherein said sump portion of said bearing housing has a third axial length greater than said first axial length of said shaft receiving portion.

16. A bearing assembly as set forth in claim 15, wherein said sump portion of said bearing housing defines a plurality of cooling fins on both respective opposite axial sides thereof.

17. A bearing assembly as set forth in claim 1, wherein said shaft receiving portion of said bearing housing includes a seat portion defining a spherical inner surface complementary to a spherical outer surface of said bearing liner to accommodate a predetermined degree of angular misalignment between said shaft and said bearing housing.

18. A bearing assembly as set forth in claim 17, wherein said bearing liner is configured having first and second thrust bearing surfaces at respective opposite ends thereof and a radial bearing surface along an inside of said shaft bore.

19. A bearing assembly as set forth in claim 1, wherein said bearing housing defines a generally semicircular flange along a bottom portion thereof for operatively mounting said bearing assembly.

20. A bearing assembly for supporting a rotatable shaft, said bearing assembly comprising:

- a bearing housing having a base element and a cap element matable to facilitate mounting of said bearing housing about said shaft, said base element defining a sump for containing a lubricant fluid therein and further defining a first partial shaft receiving portion, said cap element defining a second partial shaft receiving portion complementary to said first partial shaft receiving portion to produce a complete shaft receiving portion when said base element and said cap element are mated;
- a bearing liner contained within said complete shaft receiving portion of said bearing housing, said bearing liner defining a shaft bore through which said rotatable shaft operatively extends; and
- said complete shaft receiving portion having a first axial length approximately equal to a second axial length of said bearing liner.

21. A bearing assembly as set forth in claim 20, wherein said cap element is configured defining a radial rib extending from a top surface thereof.

22. A bearing assembly as set forth in claim 20, wherein said cap element is configured so as to not define a radial rib extending from a top surface thereof.

23. A bearing assembly as set forth in claim 20, wherein said complete shaft receiving portion of said bearing housing includes a seat portion defining a spherical inner surface complementary to a spherical outer surface of said bearing liner to accommodate a predetermined degree of angular misalignment between said shaft and said bearing housing.

24. A bearing assembly as set forth in claim 23, wherein said bearing liner is configured having first and second thrust bearing surfaces at respective opposite ends thereof and a radial bearing surface along an inside of said shaft bore.

25. A bearing assembly as set forth in claim 24, wherein said thrust bearing surfaces each define an annular oil channel radially spaced from said shaft bore, said thrust bearing surfaces further defining a plurality of radial oil channels providing fluid communication between said shaft bore and said annular oil channel.

26. A bearing assembly as set forth in claim 23, further comprising a nonmetallic element extending between said cap element and said bearing liner to prevent undesirable relative rotation therebetween.

27. A bearing assembly as set forth in claim 23, further comprising a grounding screw extending through said bearing housing and movable into contact with an outer surface of said bearing liner.

28. A bearing assembly as set forth in claim 23, wherein said bearing liner comprises a first mating element and a second mating element matable to facilitate mounting of said bearing liner about said shaft.

29. A bearing assembly as set forth in claim 23, wherein said bearing housing defines at least one circulating oil inlet and at least one circulating oil outlet.

30. A bearing assembly as set forth in claim 29, wherein said at least one circulating oil inlet comprises two circulating oil inlets and said at least one circulating oil outlet comprises two circulating oil outlets, respective of said two circulating oil inlets and said two circulating oil outlets symmetrically located on opposite lateral sides of said bearing housing.

31. A bearing assembly as set forth in claim 29, wherein said bearing housing further defines an integral weir in said at least one circulating oil outlet for maintaining a predetermined level of lubricant fluid in said sump, said integral weir defining a drain-back hole in a bottom portion thereof.

32. A bearing assembly as set forth in claim 29, wherein said at least one circulating oil inlet extends to said spherical inner surface of said seat portion and said bearing liner defines an oil ingress bore extending from said spherical outer surface thereof to said shaft bore to provide fluid communication between said oil inlet and said shaft bore.

33. A bearing assembly as set forth in claim 23, including an oil ring located in a ring opening defined in said bearing liner such that said oil ring operatively contacts a top portion of said shaft, said oil ring having a diameter sufficient to extend into said sump.

34. A bearing assembly as set forth in claim 33, including first and second lubricant dams attached to said bearing liner at respective opposite lateral locations in said ring opening, said lubricant dams being configured to confine lubricant fluid deposited on the shaft by the oil ring.

35. A bearing assembly as set forth in claim 23, including first and second lubricant seals located at respective opposite axial ends of said shaft receiving portion of said bearing housing, each of said first and second lubricant seals having an attachment portion and a seal portion, said attachment portion being connected to said complete shaft receiving portion of said bearing housing and said seal portion extending about said rotatable shaft.

36. A bearing assembly as set forth in claim 35, wherein said attachment portion of each of said first and second lubricant seals defines at least one lubricant fluid return path in a bottom portion thereof.

37. A bearing assembly as set forth in claim 36, wherein said respective end faces of said complete shaft receiving portion each define therein at least one lubricant fluid return bore providing fluid communication between said sump and said lubricant fluid return path defined in an associated of said lubricant seals.

38. A bearing assembly as set forth in claim 23, wherein said base element of said bearing housing defines a generally semicircular flange for mounting said bearing assembly.

39. A bearing assembly as set forth in claim 38, wherein said sump portion of said bearing housing defines a plurality of cooling fins on both respective opposite axial sides thereof.

40. A bearing assembly as set forth in claim 39, wherein said first axial length of said complete shaft receiving portion is less than a third axial length of said sump portion of said bearing housing.

41. A bearing assembly for supporting a rotatable shaft, said bearing assembly comprising:

- a bearing housing having a base element and a cap element matable to facilitate mounting of said bearing housing about said shaft, said base element defining a sump for containing a lubricant fluid therein and further defining a first partial shaft receiving portion, said cap element defining a second partial shaft receiving portion complementary to said first partial shaft receiving portion to produce a complete shaft receiving portion when said base element and said cap element are mated;

a bearing liner contained within said complete shaft receiving portion of said bearing housing, said bearing liner defining a shaft bore through which said rotatable shaft operatively extends;

first and second lubricant seals located at respective opposite axial ends of said complete shaft receiving portion of said bearing housing, each of said first and second lubricant seals having an attachment portion and a seal portion, said attachment portion being connected to said complete shaft receiving portion of said bearing housing and defining at least one lubricant fluid return path in a bottom portion thereof, said seal portion extending about said rotatable shaft; and said respective end faces of said complete shaft receiving portion each defining therein at least one lubricant fluid return bore providing fluid communication between said sump and said lubricant fluid return path defined in an associated of said lubricant seals.

42. A bearing assembly as set forth in claim 41, wherein said bearing housing defines at least one circulating oil inlet and at least one circulating oil outlet.

43. A bearing assembly as set forth in claim 42, wherein said complete shaft receiving portion of said bearing housing includes a seat portion defining a spherical inner surface complementary to a spherical outer surface of said bearing liner to accommodate a predetermined degree of angular misalignment between said shaft and said bearing housing.

44. A bearing assembly as set forth in claim 43, wherein said at least one oil inlet extends to said spherical inner surface of said seat portion and said bearing liner defines an oil ingress bore extending from said spherical outer surface thereof to said shaft bore to provide fluid communication between said oil inlet and said shaft bore.

45. A bearing assembly as set forth in claim 43, wherein said bearing liner is configured having first and second thrust bearing surfaces at respective opposite ends thereof and a radial bearing surface along an inside of said shaft bore.

46. A bearing assembly as set forth in claim 45, wherein said thrust bearing surfaces each define an annular oil channel radially spaced from said shaft bore, said thrust bearing surfaces further defining a plurality of radial oil channels providing fluid communication between said shaft bore and said annular oil channel.

47. A bearing assembly as set forth in claim 41, including an oil ring located in a ring opening defined in said bearing liner such that said oil ring operatively contacts a top portion of said shaft, said oil ring having a diameter sufficient to extend into said sump.

48. A bearing assembly as set forth in claim 47, including first and second lubricant dams attached to said bearing liner at respective opposite lateral locations in said ring opening, said lubricant dams being configured to confine lubricant fluid deposited on the shaft by said oil ring.

49. A bearing assembly as set forth in claim 41, wherein said base element of said bearing housing defines a generally semicircular flange for operatively mounting said bearing assembly.

50. A bearing assembly as set forth in claim 41, wherein said sump portion of said bearing housing defines a plurality of cooling fins on both respective opposite axial sides thereof.

51. A bearing assembly for supporting a rotatable shaft, said bearing assembly comprising:

a bearing housing having a shaft receiving portion;

a bearing mechanism located within shaft receiving portion of said bearing housing, said bearing mechanism defining a shaft bore through which said rotatable shaft operatively extends;

first and second lubricant seals located at respective opposite axial ends of said shaft receiving portion, each of said lubricant seals including an annular flange portion integrally extending into an extension portion having an annular seal structure located on an inside thereof, said annular flange portion being connected to a respective end face of said shaft receiving portion and said extension portion being situated about said shaft; and said extension portion of at least one of said first and second lubricant seals defining therein at least one radial receiving hole for mounting a selected sensor device.

52. A bearing assembly as set forth in claim 51, wherein said at least one radial receiving hole comprises first and second radial receiving holes spaced by a predetermined angular separation.

53. A bearing assembly as set forth in claim 52, wherein said selected sensor device comprises first and second vibration sensors mounted in respective of said first and second radial receiving holes.

54. A bearing assembly as set forth in claim 53, wherein said at least one of said lubricant seals is configured to be connected to said shaft receiving portion of said bearing housing in a plurality of angular positions.

55. A bearing assembly as set forth in claim 51, wherein said first and second lubricant seals are connected to said shaft receiving portion of said bearing housing utilizing a plurality of threaded members extending through respective mounting holes defined in said annular flange portion and into respective threaded bores defined in said end face of said shaft receiving portion.

56. A bearing assembly as set forth in claim 55, further comprising an air seal mounted axially outboard of one of said first and second lubricant seals, said air seal having a flanged attachment portion integrally extending into an extended seal portion, said attachment portion being adjacent to said annular flange portion of said one of said first and second lubricant seals.

57. A bearing assembly as set forth in claim 56, wherein said flanged attachment portion of said air seal defines a plurality of mounting holes and wherein said air seal is connected to said shaft receiving portion of said bearing housing utilizing said threaded members.

58. A bearing assembly as set forth in claim 56, wherein said extended seal portion defines therein at least one tap for connecting a measurement device thereto.

59. A bearing assembly as set forth in claim 58, wherein said at least one tap comprises a pair of spaced apart taps for facilitating connection of a manometer device.

60. A bearing assembly as set forth in claim 56, wherein at least one of said air seal and said first and second lubricant seals is electrically isolated from said bearing housing.

* * * * *